United States Patent Office 3,106,993
Patented Oct. 15, 1963

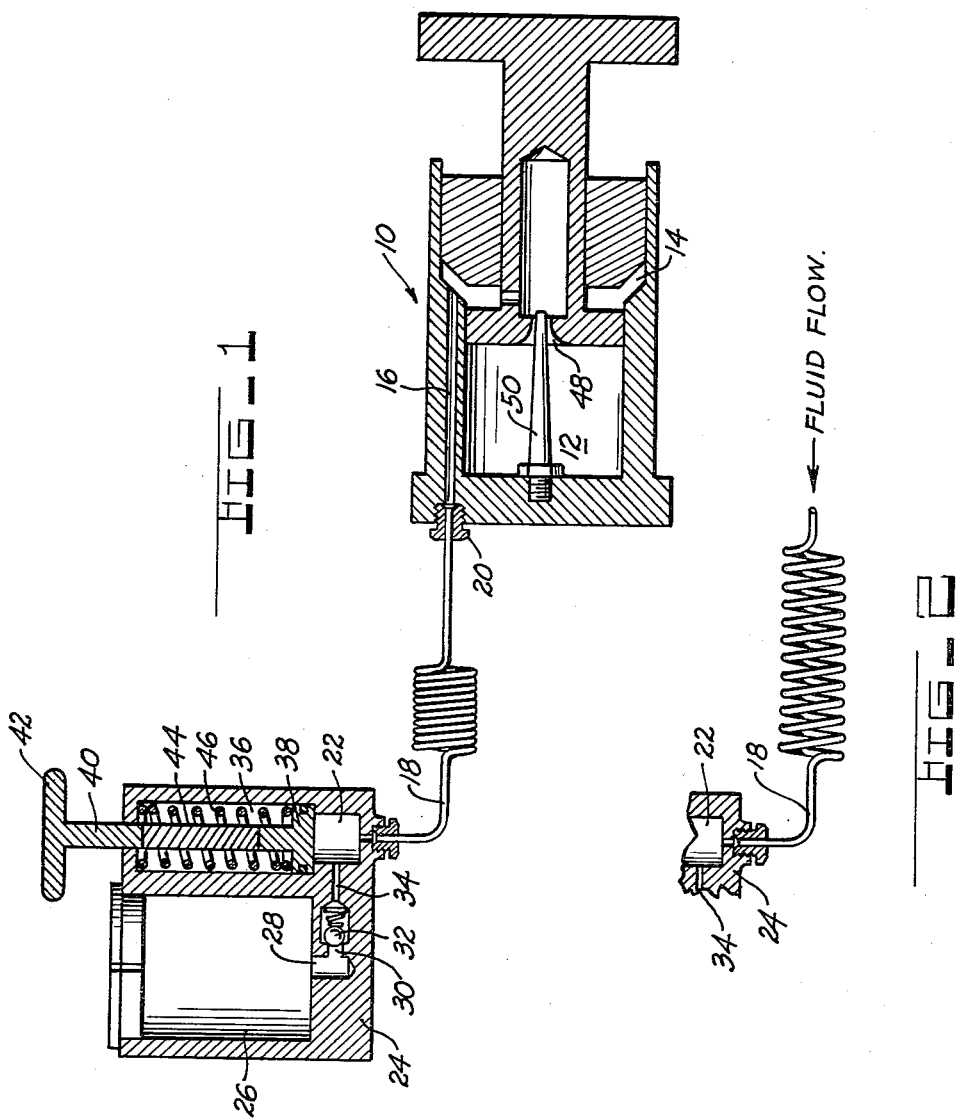

3,106,993
FLUID SHOCK ABSORBING SYSTEM
Howard J. May, South Bend, Ind., assignor to The Bendix Corporation, South Bend, Ind., a corporation of Delaware
Filed May 7, 1962, Ser. No. 192,836
5 Claims. (Cl. 188—88)

This invention relates to a means of replenishing a fluid in a shock absorber which means also incorporates a means of visually inspecting the fluid level in the shock absorber.

Due to the high loads applied to shock absorbing devices the sealing of such has been a major problem. Thus, fluid leakage is nothing new to almost any type of shock absorber. As may be naturally expected, such leakage greatly reduces the capacity of the shock absorber to function as designed.

It is therefore, an object of this invention to insure an adequate supply of fluid within a shock absorber.

Another object is to provide a visual indicator portraying the amount of fluid in a shock absorber.

Still another object of this invention is to combine a replenishing means with an indicator means to provide visual means adjacent the replenishing device to reduce the possibility of overlooking the needs of a shock absorber.

A still further object of this invention is to provide a means of increasing the damping characteristics of a shock absorber.

Other and further advantages will be readily seen by those skilled in the art from the following description of the accompanying drawing in which:

FIGURE 1 is a sectional schematic of a hydraulic shock absorber system employing my invention; and FIGURE 2 is a view of the hollow spring connecting the shock absorber and indicating replenishing means together with the spring expanded as when the shock absorber has a load applied thereto.

With more particular regard to the drawing, a shock absorber 10 is shown by FIGURE 1 having two variable volume chambers 12 and 14. Chamber 14 is connected by a passage 16 to a coiled tube 18, as at 20, by any suitable means, such as the fitting shown. The other end of the coiled tube 18 is connected to an accumulator chamber 22 within a housing 24 by any suitable means.

The housing 24 contains a supply chamber 26 which may be filled with a shock absorber fluid. The chamber 26 is ported as at 28 to a passage 30, and a check valve 32 is placed to oppose flow to passage 30 towards chamber 26. From chamber 22 a passage 34 connects with passage 30 behind the check valve 32. In addition, the housing 24 contains a pump chamber 36 which is integrally associated with accumulator chamber 22 but separated therefrom by a piston 38 mounted to a rod 40 which extends exteriorly of housing 24 and terminates in a handle 42. The rod 40 is colored green for a major portion of its intermediate length, as at 44, which coloring will be exposed whenever the shock absorber 10 contains an ample fluid supply. As shown by FIGURE 1 the rod 40 is in its full down position, as so urged by spring 46 when fluid pressure cannot overcome the spring forces, and in this position the colored area is out of sight indicating a need for fluid in shock absorber 10.

When a load is applied to shock absorber 10 fluid is forced from chamber 12 through orifice 48, which orifice is restricted varyingly by metering pin 50, to chamber 14 and thence to passage 16. From passage 16 the fluid enters chamber 22 by way of coiled tube 18, which tube is expanded, as seen in FIGURE 2.

The use of a coiled tube in such a manner also permits increased damping capabilities for the shock absorber 10 in that conventional shock absorbers employing orifice control by way of a metering pin are inefficient and harsh as they require compromises for damping action under long and short strokes, blow-off valves and other controls on the fluid flow controls. With my shock absorber, difficulties of this sort do not occur as the long coiled tube provides a narrow fluid passage which resists fluid flow therethrough which is generally speaking non-velocity dependent.

As other embodiments may be readily constructed which do not depart from the scope of the invention herein described, I do not propose to be limited by the foregoing description, but rather intend that the true spirit of my invention be disclosed by the appended claims.

I claim:

1. A fluid shock absorbing system comprising:
    a means receiving displaced fluid;
    a means receiving shock forces including a piston having an orifice therethrough, a metering pin for varying the area of said orifice, and variable volume chambers controlled by said piston;
    a means connecting said fluid receiving means with said means receiving said shock forces, which connecting means includes an expansible means having a restricted flow passage providing a non-velocity dependent damping characteristic for the flow of fluid from one of said variable volume chambers;
    a fluid supply means; and
    a means to draw fluid from said supply means to replenish fluid in said fluid receiving means, which fluid drawing means is interconnected with said fluid supply means and said fluid receiving means.

2. A fluid shock absorbing system according to claim 1 and further comprising:
    an indicator means associated with said fluid receiving means to indicate the amount of fluid in said shock absorbing system.

3. A fluid shock absorbing system according to claim 2 wherein said indicator means is operatively associated with said means drawing fluid from said supply means to replenish fluid in said fluid receiving means.

4. A fluid shock absorbing system according to claim 1 and further comprising:
    a means to prevent flow of fluid from said fluid receiving means to said fluid supply means, which flow preventing means permits flow from said fluid supply means to said fluid receiving means.

5. For use with a hydraulic shock absorber, a means to indicate the amount of hydraulic fluid within the shock absorber and replenish same when low comprising:
    a housing having a fluid supply chamber and an accumulator chamber therein connected by a passage;
    a spring biased piston element slidably mounted in said accumulator chamber, which piston element is adapted to be controlled exteriorly of said accumulator chamber;

a coiled tube connecting said accumulator chamber with the shock absorber, which coiled tube provides a flow path between said accumulator chamber and the shock absorber;

a check valve in said passage in said housing to allow only unidirectional flow from said fluid supply chamber to said accumulator chamber under the direction of said piston elements; and a visual indicator associated with said piston element in said accumulator chamber to provide an indication of fluid in said shock absorber.

References Cited in the file of this patent

UNITED STATES PATENTS

| | | |
|---|---|---|
| 2,065,832 | Spyder | Dec. 29, 1936 |
| 2,436,009 | Kremiller | Feb. 17, 1948 |
| 2,440,353 | Wallace | Apr. 27, 1948 |
| 2,943,642 | Westcott | July 5, 1960 |
| 3,015,345 | Michael | Jan. 2, 1962 |

FOREIGN PATENTS

| | | |
|---|---|---|
| 125,035 | Great Britain | Apr. 10, 1919 |
| 132,399 | Sweden | July 17, 1951 |